United States Patent
Nellen et al.

(10) Patent No.: US 8,444,217 B2
(45) Date of Patent: May 21, 2013

(54) OPEN ROOF CONSTRUCTION FOR A VEHICLE

(75) Inventors: Marcel Johan Christiaan Nellen, Merselo (NL); Peter Christiaan Leonardus Johannes Manders, Horst (NL); Joseph Petrus Johannus Sanders, Cuyk (NL); Robert Rikkert, Nuenen (NL); Ronny Doornink, Malden (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/088,785

(22) Filed: Apr. 18, 2011

(65) Prior Publication Data

US 2011/0254323 A1  Oct. 20, 2011

(30) Foreign Application Priority Data

Apr. 20, 2010  (EP) .................................... 10160457

(51) Int. Cl.
*B60J 7/047* (2006.01)
(52) U.S. Cl.
USPC ................. 296/223; 296/216.08; 296/216.03; 296/216.05
(58) Field of Classification Search
USPC ............................................ 296/216.01–224
See application file for complete search history.

(56) References Cited

U.S. PATENT DOCUMENTS

| 4,995,667 | A * | 2/1991 | Tamura et al. | 296/216.03 |
| 6,916,064 | B2 * | 7/2005 | Bohm et al. | 296/216.04 |
| 2006/0080903 | A1 | 4/2006 | Grimm | |
| 2011/0254323 | A1 | 10/2011 | Nellen | |

FOREIGN PATENT DOCUMENTS

| DE | 10143823 | 3/2003 |
| DE | 10143823 A1 | 3/2003 |
| DE | 10201636 | 8/2003 |
| DE | 10201636 A1 | 8/2003 |

(Continued)

OTHER PUBLICATIONS

European Search Report of the European Patent Office Patent Office in counterpart foreign application No. 10160457.7 filed Apr. 20, 2010.
European Search Report of the European Patent Office Patent Office in counterpart foreign application No. 11194269.4 filed Dec. 19, 2011, dated May 29, 2012.

(Continued)

*Primary Examiner* — Dennis Pedder
(74) *Attorney, Agent, or Firm* — Steven M. Koehler; Westman, Champlin & Kelly, P.A.

(57) ABSTRACT

An open roof construction for a vehicle comprises a stationary roof part, a roof opening provided therein, and a roof assembly mounted to the stationary roof part, having a panel which is movable between closed and open positions for closing and opening, respectively, said roof opening. A moving mechanism is provided for connecting the movable panel to the stationary roof and moving it with respect thereto, wherein the moving mechanism at least comprises two longitudinal curved parts attached to the movable panel, two stationary guides extending along opposite longitudinal edges of the roof opening and two linking mechanisms for movably linking the stationary guides with the respective curved parts. The stationary guides extend in a curved manner in such a way that, as seen in a top plan view of the vehicle, the distance between the stationary guides varies at different lengthwise positions of the vehicle, wherein each curved part is attached to a pivot arm which is attached to the movable panel and which is configured to pivot with respect to the panel around a vertically extending pivot axis.

30 Claims, 5 Drawing Sheets

FOREIGN PATENT DOCUMENTS

| | | |
|---|---|---|
| DE | 102009025331 | 12/2010 |
| EP | 1650068 | 4/2006 |
| EP | 1650068 A2 | 4/2006 |
| EP | 2380763 | 10/2011 |
| WO | WO 2009152789 | 12/2009 |
| WO | WO 2009152789 A1 | 12/2009 |

OTHER PUBLICATIONS

European Search Report of the European Patent Office Patent Office in foreign application No. 10160457.7 filed Apr. 2010, dated Jun. 15, 2010.

* cited by examiner

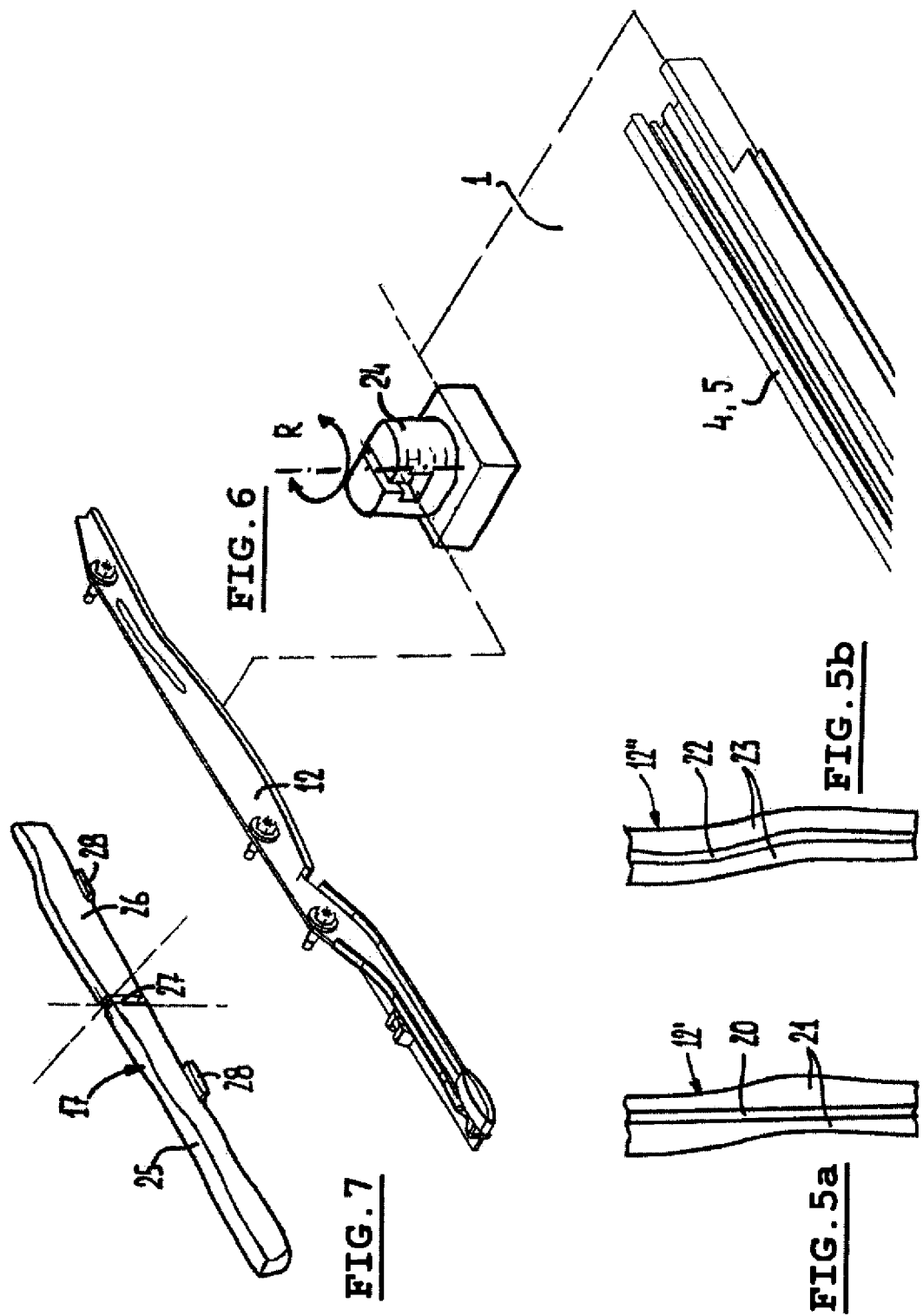

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a stationary roof part, a roof opening provided therein, a panel which is movable between closed and open positions for closing and opening, respectively, said roof opening and a moving mechanism for connecting the movable panel to the stationary roof and moving it with respect thereto, wherein the moving mechanism at least comprises two longitudinal curved parts attached to the movable panel, two stationary guides extending along opposite longitudinal edges of the roof opening and two linking mechanisms for movably linking the stationary guides with the respective curved parts.

In a known open roof construction of the above type the stationary guides extend in parallel over their entire length and cooperate with the linking mechanisms for offering the movable panel the desired sequence of movements, depending on what type of panel is used (for example spoiler or top slider). Many types of linking mechanisms are known in the state of the art, all with specific characteristics.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

One aspect of the present invention includes an open roof construction for a vehicle provided with stationary guides that extend in a curved manner in such a way that, as seen in a top plan view of the vehicle, the distance between the stationary guides varies at different lengthwise positions of the vehicle, wherein each curved part is attached to a pivot arm which is attached to the movable panel and which is configured to pivot with respect to the panel around a vertically extending pivot axis.

The use of curved stationary guides makes it possible to design the open roof construction in accordance with the curvature of the roof of the vehicle. The pivot arms provide compensation for the varying distance between the stationary guides, such that, notwithstanding the curved shape of the stationary guides, basically the use of standard linking mechanisms remains possible.

In one embodiment of the open roof construction, the stationary guides comprise forward curved sections and rearward parallel sections, wherein each pivot axis is located near a rearward edge of the movable panel, such that, in the closed position of the movable panel and as seen in a top plan view, it substantially coincides with a rearward section of the respective stationary guide.

As a result of such an arrangement the complexity of the open roof construction may be limited as far as possible, because the pivot axes do not have to move laterally with respect to the movable panel when the latter moves between its closed and open positions.

In another embodiment of the open roof construction, a free end of the pivot arm opposite its end located at the pivot axis cooperates with a curved guide attached to the movable panel.

This stabilises the position of the pivot arm and thus of the curved part attached thereto for minimising undesired movements thereof.

It is possible, for example, that the free end of the pivot arm and the curved guide are shaped and cooperate such as to prevent a vertical relative motion there between.

When, in accordance with another embodiment of the open roof construction, the pivotal motion of the pivot arms is biased, a stable position of the movable panel is promoted without the occurrence of unwanted phenomena, such as rattling sounds.

The correct position of the movable panel may be improved when the pivotal motions of the pivot arms are coupled. Such a coupling may occur in many different ways (for example mechanically and/or electrically and/or pneumatically and/or hydraulically).

Although the provision of the pivot arms allows an adjustment of the moving mechanism to the varying distance between the stationary, curved guides, the pivot motion of the pivot arms and thus of the curved parts will cause an angular disposition between parts of the linking mechanisms which, in some instances, should be compensated. For achieving such a compensation options are available.

In one embodiment of the open roof construction, the curved parts, as seen in a top plan view, are curved in a manner substantially corresponding with the curvature of the respective stationary guides. This may be realised in different ways: the curved parts may comprise a central plate extending in a vertical plane and guide ribs extending laterally therefrom with varying width in accordance with the curvature to be obtained, or as an alternative the curved parts may comprise a central plate extending in a curved plane in accordance with the curvature to be obtained and guide ribs extending laterally therefrom with a constant width. In both instances the curved shape of the curved part (as seen in a top plan view; of course the curved parts already will have a curved shape as seen in a sideways direction) allows a cooperation between parts of the linking mechanisms which remains effective and (nearly) optimal notwithstanding the pivotal movement of the pivot arms (and curved parts).

In yet another embodiment of the open roof construction, the moving mechanism further comprises guide claws for cooperation with the curved parts which are rotatably connected to the stationary roof part. The possibility of rotating offers the guide claws the opportunity to adopt a rotational position in accordance with the pivoted position of the curved parts.

As stated above the open roof construction, and specifically the linking mechanisms thereof, may come in many different shapes. The linking mechanism, for example, further may comprises slides moving in the stationary guides. It is possible, then, that these slides are flexible for adapting to the shape of the stationary guides. This may be achieved when the slides substantially are made of a flexible material. The material should be sufficiently flexible to enable the desired adaptation of its shape, yet be sufficiently strong and robust to withstand the operational forces of any parts of the linking mechanism cooperating therewith during prolonged use.

As an alternative the slides may comprise a forward and rearward slide part interconnected by a vertically extending hinge. Such a hinge also offers a degree of flexibility.

However, it is possible too, as an alternative or in addition to the previous embodiments, that the slides comprise flexible guide shoes.

BRIEF DESCRIPTION OF THE DRAWINGS

Hereinafter aspects of the invention will be elucidated while referring to the drawing, in which:

FIGS. 3-7 show, schematically and on a larger scale, details of embodiments of the open roof construction.

DETAILED DESCRIPTION OF THE ILLUSTRATIVE EMBODIMENTS

Figure 1:
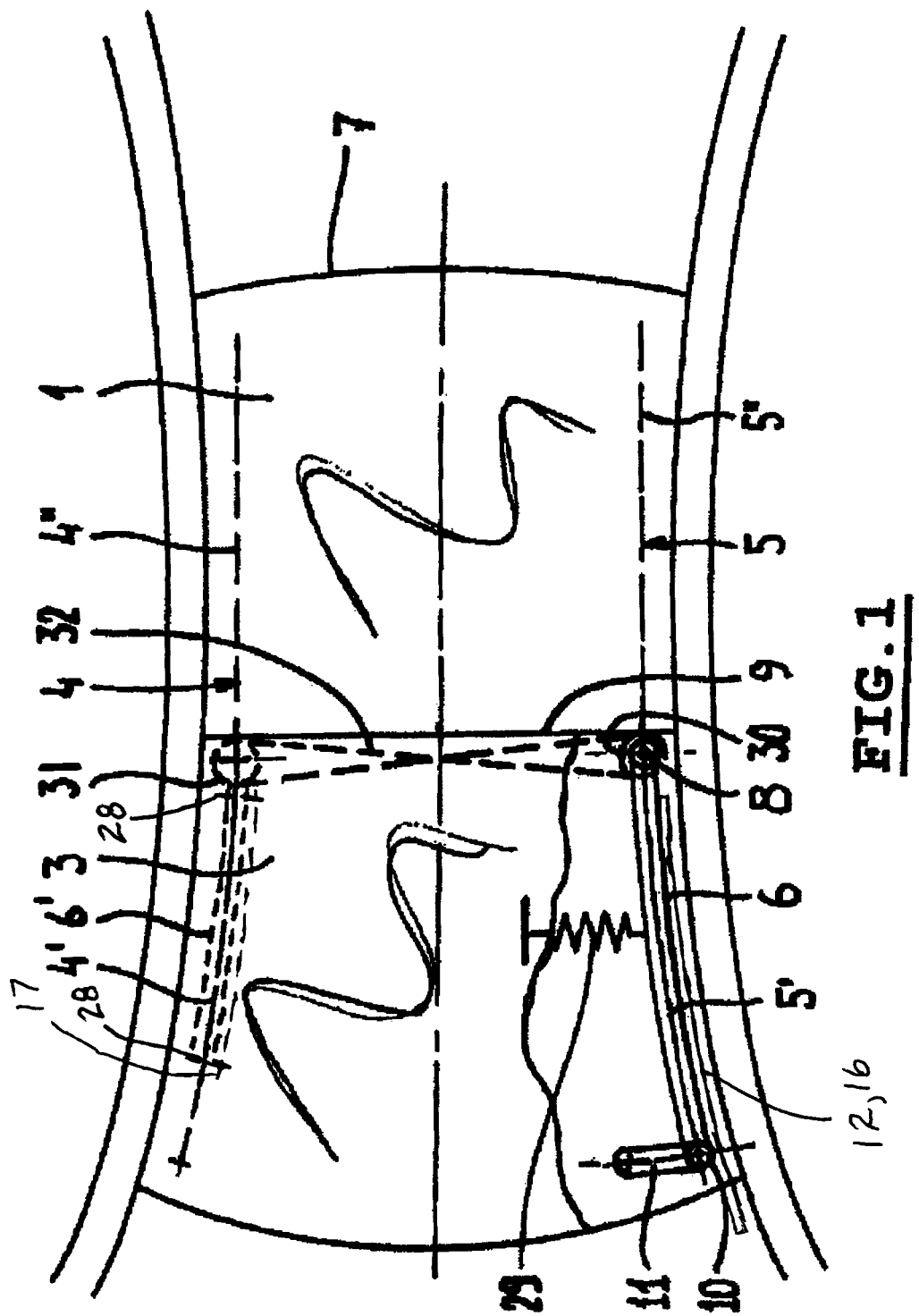
FIG. 1 schematically shows a top plan view of an open roof construction in a closed position.
Figure 2:
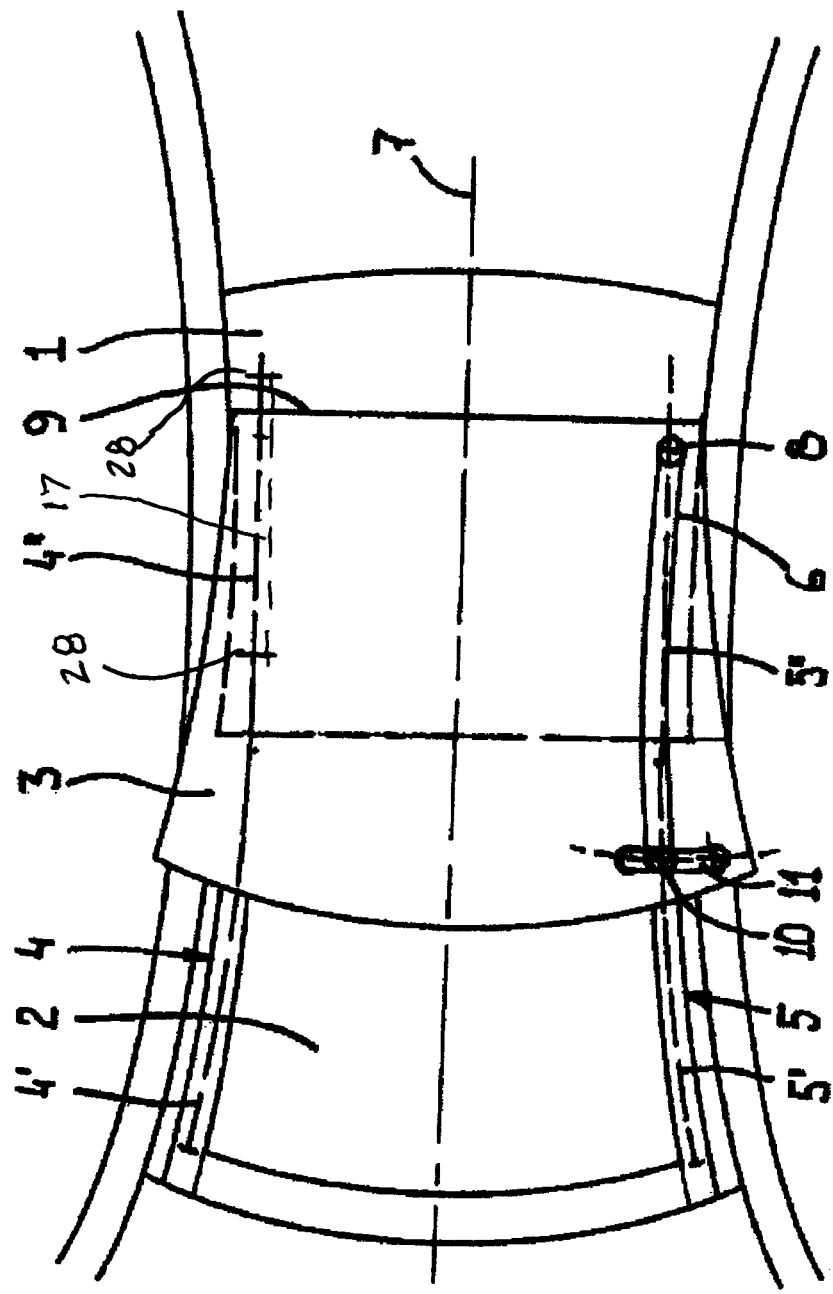
FIG. 2 schematically shows a top plan view of said open roof construction in an open position.

Firstly referring to FIGS. 1 and 2, an open roof construction for a vehicle is shown schematically in a top plan view. It comprises a stationary roof part 1, a roof opening 2 provided therein and roof assembly, mounted to the stationary roof part 1, having a panel 3 which is movable between a closed position (FIG. 1) and an open position (FIG. 2) for closing and opening, respectively, said roof opening 2. The open roof construction and roof assembly further comprises, as known per se, a moving mechanism for connecting the movable panel 3 to the stationary roof 2 and moving it with respect thereto. The moving mechanism at least comprises two longitudinal curved parts (illustrated in FIGS. 3-7) attacked to the movable panel 3, two stationary guides 4 and 5 extending along opposite longitudinal edges of the roof opening 2 being formed from the material of the fixed roof or separate parts affixed thereto and two linking mechanisms (parts of which are illustrated in FIGS. 3-7) for movably linking the stationary guides 4,5 with the respective curved parts.

As appears clearly from FIGS. 1 and 2, the stationary guides 4,5 extend in a curved manner in such a way that, as seen in a top plan view of the vehicle, the distance between the stationary guides varies at different lengthwise positions of the vehicle. As a result the roof opening 2 may closely follow the contour of the vehicle, improving the aesthetic appearance of the vehicle.

In the embodiment illustrated in FIGS. 1 and 2 the stationary guides 4,5 comprise forward curved sections 4', 5' and rearward parallel sections 4" and 5".

The movable panel 3 comprises pivot arms 6 (only one of which has been illustrated; the other is a mirror image at the opposite side of the center line 7) having a pivot axis 8 located near the rearward edge 9 of the movable panel 3, such that, in the closed position of the movable panel and as seen in a top plan view, the pivot axis 8 substantially coincides or overlaps with a rearward section 4" or 5" of the respective stationary guide 4 or 5. As will be shown later each curved part is attached to such a pivot arm 6.

A free end 10 of the pivot arm 6 opposite its end located at the pivot axis 8 cooperates with a curved guide 11 attached to the movable panel 3. In one embodiment, the free end 10 of the pivot arm 6 and the curved guide 11 are shaped and cooperate such as to prevent a vertical relative motion there between. This is illustrated in FIG. 3.

Biasing device 29 such as various forms of springs (tension, compression, torsion), resilient material that acts like a spring, etc. may be provided for biasing the pivotal motion of the pivot arms 6 (i.e., where each of the free ends 10 are biased inwardly toward each other, or outwardly away from each other). Further coupling mechanism (FIG. 1) may be provided for coupling the pivotal motions of the pivot arms 6. Herein the coupling device exemplified is schematically illustrated in FIG. 1 and includes a pulley 30, 31 connected to each of the pivot arms 6 and includes an endless, flexible member 32 joining the pulleys 30, 31 together, and thus, the pivot arms 6

The pivotal motion of the arms 6 will occur in correspondence with the movement of the panel 3 as a result of the varying distance between the stationary curved guides 4, 5. As a result the position of the curved parts (which are attached to the pivot arms 6 as will appear later) may adopt a position in correspondence with said varying distance.

Figure 3:
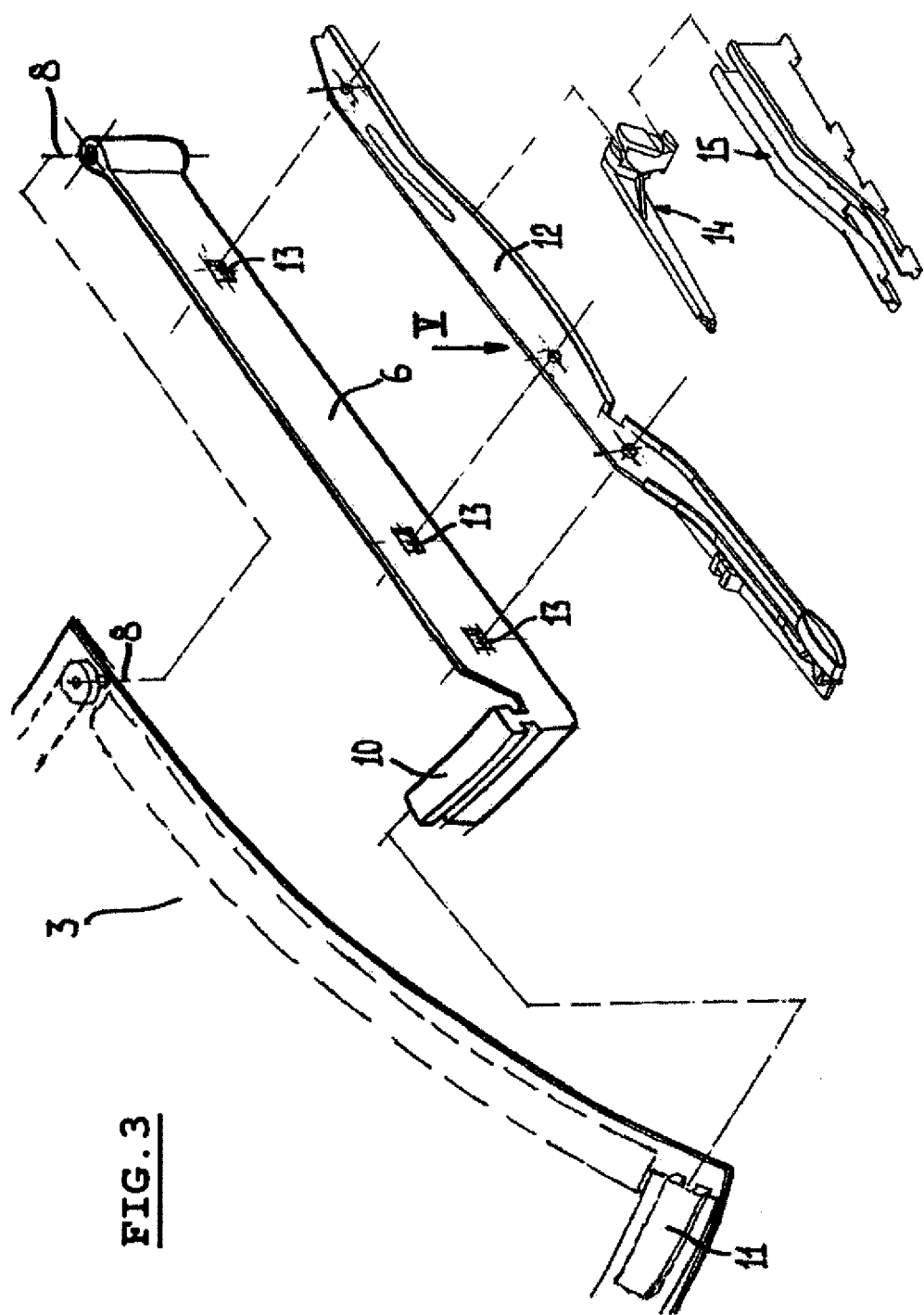

FIG. 3 illustrates in a schematical explosion view parts of a linking mechanism and a pivot arm. The pivot arm 6 is shown with its pivot axis 8 at one end and its free end 10 for cooperation with the curved guide 11 of the movable panel 3 at the opposite end. The pivot axis 8 extends substantially vertically or substantially orthogonal to a major surface of the panel 3. The free end 10 and curved guide 11 have mating profiles. The linking mechanism comprises, among others, a curved part 12 having a construction which may be known per se. This curved part 12 will be attached to the pivot arm 6 (e.g. by screws extending through holes 13 in the pivot arm 6). In a manner known per se the curved part 12 will cooperate with specific guide and coupling members 14 and 15 which (depending on the type of panel 3 and the movement thereof) will cooperate with each other and with the stationary guides 4,5 in a manner known per se and not further elucidated here.

Figure 4:
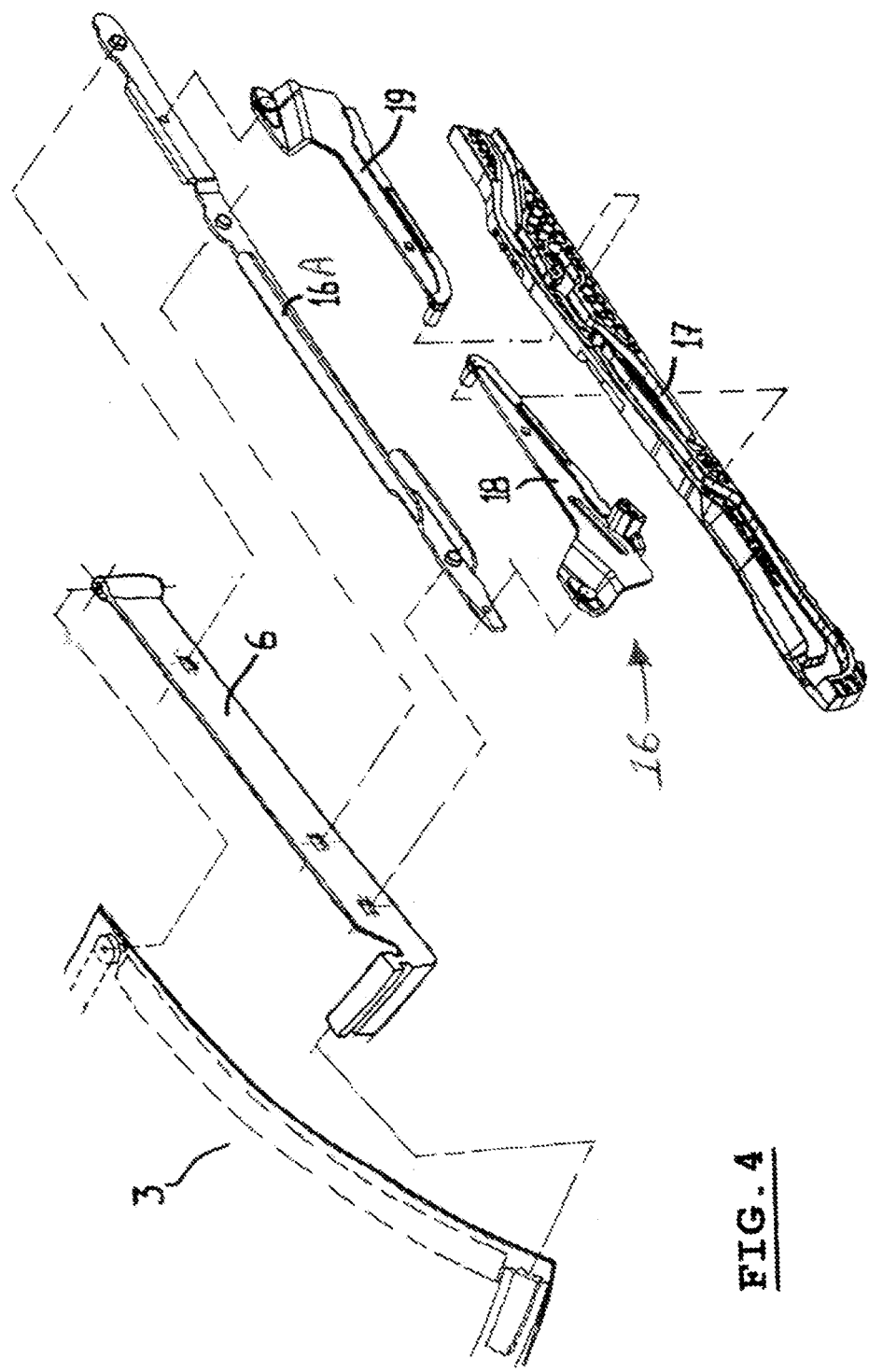

FIG. 4 likewise shows an intermediate component 16 (comprising support 16A and linking arms 18,19) to be attached to the pivot arm 6 of the movable panel 3. Here, the linking mechanism further comprise a slide 17 which will slide in a stationary guide 4,5 and linking arms 18,19 linking, in a manner known per se, the movement of the slide 17 with the movement of the intermediate component 16 and thus of the panel 3.

Next, embodiments are illustrated in which measures are taken to take into account the rotational disposition which will occur between a curved part and the respective stationary guide (or part of a linking mechanism cooperating therewith) when the pivot arm 6 pivots. Generally these measures provide curved parts which, as seen in a top plan view, are curved in a manner substantially corresponding with the curvature of the respective stationary guide. FIG. 5 (which basically shows a view according to arrow V in FIG. 3) shows a curved part 12' comprising a central plate 20 extending in a vertical plane and guide ribs 21 extending laterally therefrom with varying width in accordance with the curvature to be obtained. FIG. 5b shows an alternative, in which the curved part 12" comprise a central plate 22 extending in a curved plane in accordance with the curvature to be obtained and guide ribs 23 extending laterally therefrom with a constant width.

When the open roof construction according to the present invention further comprises guide claws 24 (attached to the stationary roof part 1) for cooperation with the curved parts 12, these can be rotatably connected to the stationary roof part (as indicated schematically in FIG. 6 by arrow R).

In the embodiment according to FIG. 4 the slide 17 may be flexible for adapting to the shape of the stationary guides 4,5. But also the support 16A may be curved as seen in a top plan view.

The slide 17 then substantially may be made of a flexible material or, as shown schematically in FIG. 7, may comprise a forward slide part 25 and rearward slide part 26 interconnected by a vertically extending hinge 27.

Finally it is possible too that the slides 17 comprise flexible guide shoes 28 that engage stationary guides 4,5 in a complementary manner, the guide shoes 28 being flexible to adapt to the shape of the stationary guides 4,5 when guided thereon.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. An open roof construction for a vehicle, comprising a stationary roof part, a roof opening provided therein, a panel which is movable between closed and open positions for closing and opening, respectively, said roof opening and a moving mechanism for connecting the movable panel to the stationary roof and moving the panel with respect thereto, wherein the moving mechanism at least comprises two longitudinally curved parts attached to the movable panel, two stationary guides extending along opposite longitudinal edges of the roof opening and two linking mechanisms linking the stationary guides with the respective curved parts, wherein the curved parts include guide surfaces substantially longitudinally fixed thereon wherein the guide surfaces are configured to slidably engage with surfaces of the linking mechanism to cause vertical displacement of the curved parts and the panel wherein the stationary guides extend in a curved manner in such a way that, as seen in a top plan view of the vehicle, the distance between the stationary guides varies at different lengthwise positions of the vehicle, wherein each curved part is attached to a pivot arm which is attached to the movable panel and which is configured to pivot with respect to the panel around a vertically extending pivot axis.

2. The open roof construction according to claim 1, wherein the stationary guides comprise forward curved sections and rearward parallel sections, and wherein each pivot axis is located near a rearward edge of the movable panel, such that, in the closed position of the movable panel and as seen in a top plan view, the pivot axis substantially coincides with a rearward section of the respective stationary guide.

3. The open roof construction according to claim 1, wherein a free end of the pivot arm opposite its end located at the pivot axis cooperates with a curved guide attached to the movable panel.

4. The open roof construction according to claim 3, wherein the free end of the pivot arm and the curved guide are shaped and cooperate such as to prevent a vertical relative motion there between.

5. The open roof construction according to claim 1, wherein the pivotal motion of the pivot arms is biased.

6. The open roof construction according to claim 1, wherein the pivotal motions of the pivot arms are coupled.

7. The open roof construction according to claim 1, wherein the curved parts, as seen in a top plan view, are curved in a manner substantially corresponding with the curvature of the respective stationary guides.

8. The open roof construction according to claim 7, wherein the curved parts comprise a central plate extending in a vertical plane and the guide surfaces comprise guide ribs extending laterally therefrom with varying width.

9. The open roof construction according to claim 7, wherein the curved parts comprise a central plate extending in a curved plane and the guide surfaces comprise guide ribs extending laterally therefrom with a constant width.

10. The open roof construction according to claim 1, wherein the moving mechanism further comprises guide claws for cooperation with the curved parts which are rotatably connected to the stationary roof part.

11. The open roof construction according to claim 1, wherein the linking mechanism further comprises slides moving in the stationary guides, which slides are flexible for adapting to the shape of the stationary guides.

12. The open roof construction according to claim 11, wherein the slides substantially are made of a flexible material.

13. The open roof construction according to claim 11, wherein the slides comprise a forward and rearward slide part interconnected by a vertically extending hinge.

14. A roof assembly for a vehicle having a roof opening in a roof part, the roof assembly comprising:
    a panel configured to close the roof opening; and
    a moving mechanism connected to the panel and configured to move the panel relative to the roof opening when the roof assembly is mounted to the vehicle, wherein the moving mechanism at least comprises, on each of two opposite sides of the panel:
        a longitudinally curved part attached to a side of the panel, the curved part having guide surfaces configured to move longitudinally therewith;
        a pivot arm fixedly connected to the longitudinally curved part and pivotally joined to the panel proximate the longitudinally curved part, wherein a pivot axis of each pivot arm is substantially orthogonal to a major surface of the panel; and
        a slide configured to be slid along an edge of the roof opening, the slide being connected to the curved part wherein the guide surfaces are configured to slidably engage with surfaces of the slide to cause vertical displacement of the curved part and the panel.

15. The roof assembly of claim 14 and further comprising two stationary guides mountable to the roof part each stationary guide configured to engage one of the slides, configured to allow each slide to slide thereon, the stationary guides extending in a curved manner in such a way that that when mounted to the roof part, a distance between the stationary guides varies at different lengthwise positions of the vehicle.

16. The roof assembly according to claim 15, wherein each of the stationary guides comprise a forward curved section and a rearward section, and wherein each pivot axis is located near a rearward edge of the movable panel, such that, in the closed position of the movable panel and as seen in a top plan view, the pivot axis substantially coincides with a rearward section of the respective stationary guide.

17. The roof assembly according to claim 14, wherein a free end of the pivot arm opposite its end located at the pivot axis cooperates with a curved guide attached to the movable panel.

18. The roof assembly according to claim 17, wherein the free end of the pivot arm and the curved guide are shaped and cooperate such as to prevent a vertical relative motion there between.

19. The roof assembly according to claim 14, wherein the pivotal motion of the pivot arms is biased.

20. The roof assembly according to claim 14, wherein the pivotal motions of the pivot arms are coupled.

21. The roof assembly according to claim 14, wherein the curved parts, as seen in a top plan view, are curved in a manner substantially corresponding with the curvature of the respective stationary guides.

22. The roof assembly according to claim 21, wherein the curved parts comprise a central plate extending in a vertical plane and the guide surfaces comprise guide ribs extending laterally therefrom with varying width.

23. The roof assembly according to claim 21, wherein the curved parts comprise a central plate extending in a curved plane and the guide surfaces comprise guide ribs extending laterally therefrom with a constant width.

24. The roof assembly according to claim 14, wherein the moving mechanism further comprises guide claws for cooperation with the curved parts which are rotatably connected to the stationary roof part.

25. A roof assembly for a vehicle having a roof opening in a roof part, the roof assembly comprising:
   a panel configured to close the roof opening; and
   a moving mechanism connected to the panel and configured to move the panel relative to the roof opening when the roof assembly is mounted to the vehicle, wherein the moving mechanism at least comprises, on each of two opposite sides of the panel:
      an intermediate component attached to a side of the panel, the intermediate component having guide surfaces configured to move longitudinally therewith;
      a pivot arm fixedly connected to the intermediate component and pivotally joined to the panel proximate the intermediate component, wherein a pivot axis of each pivot arm is substantially orthogonal to a major surface of the panel; and
      a slide configured to be slid along an edge of the roof opening, the slide being connected to the intermediate component wherein the guide surfaces are configured to slidably engage with surfaces of the slide to cause vertical displacement of the intermediate component and the panel.

26. The roof assembly according to claim 25, wherein the moving mechanism further comprises slides configured to slide in the stationary guides, which slides are flexible for adapting to the shape of the stationary guides.

27. The roof assembly according to claim 25, wherein the slides substantially are made of a flexible material.

28. The roof assembly according to claim 25, wherein the slides comprise a forward and rearward slide part interconnected by a vertically extending hinge.

29. The roof assembly of claim 25 wherein the intermediate component includes a link arm pivotally mounted to a support wherein the guide surfaces are provided on the link arm.

30. The open roof construction of claim 29 wherein the intermediate component includes a second pivoting link arm wherein the guide surfaces are provided on each of the link arms.

* * * * *